March 28, 1933. A. A. WILLIAMS 1,903,208
AUTOMATIC GATE
Filed Aug. 11, 1932 4 Sheets-Sheet 1

Armand A. Williams INVENTOR

March 28, 1933.  A. A. WILLIAMS  1,903,208
AUTOMATIC GATE
Filed Aug. 11, 1932    4 Sheets-Sheet 3

Armand A. Williams, INVENTOR
BY
ATTORNEY

March 28, 1933.  A. A. WILLIAMS  1,903,208
AUTOMATIC GATE
Filed Aug. 11, 1932  4 Sheets-Sheet 4
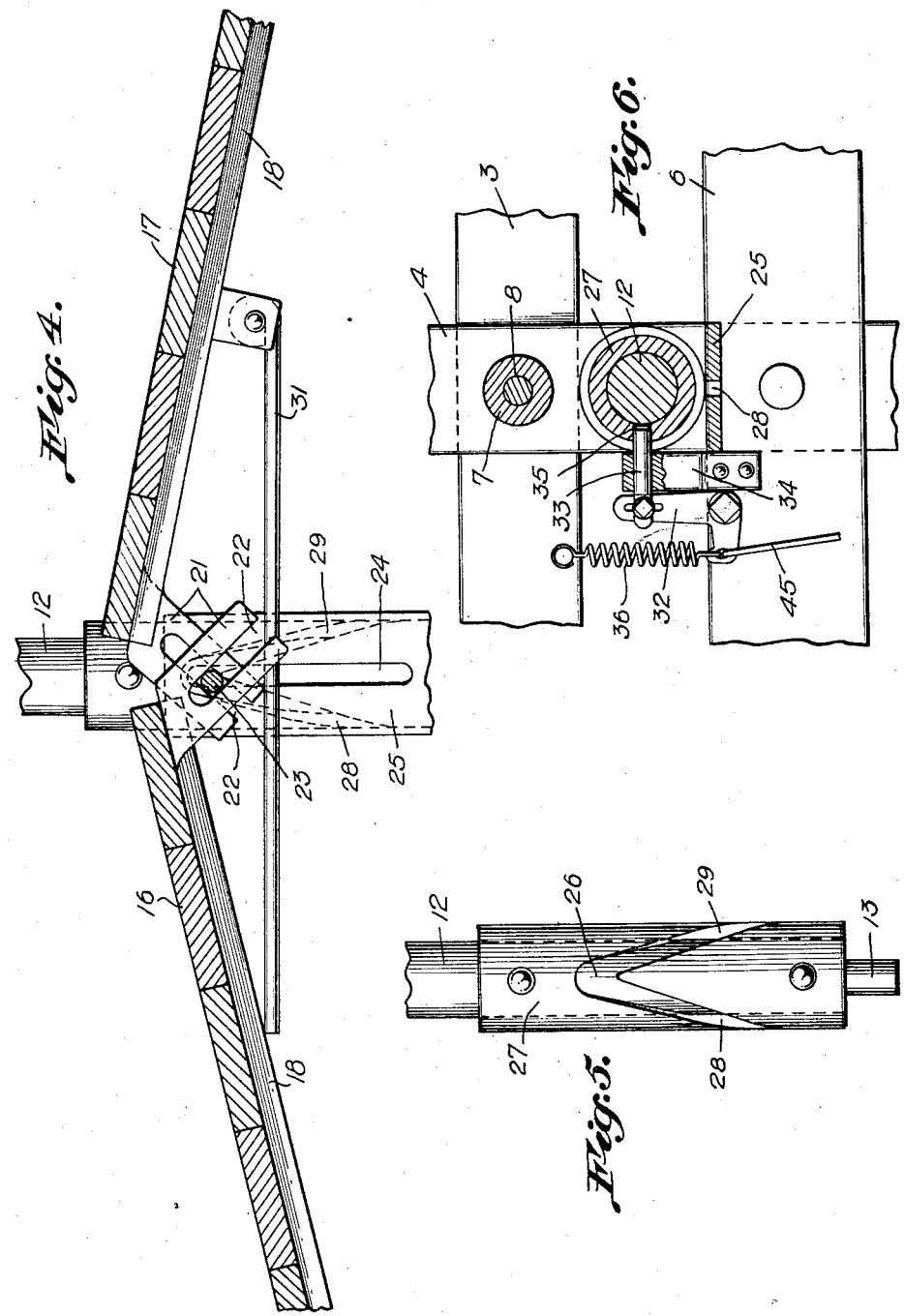
Armand A. Williams, INVENTOR
BY E. H. Bond
ATTORNEY Patented Mar. 28, 1933

1,903,208

UNITED STATES PATENT OFFICE

ARMAND A. WILLIAMS, OF GHENT, WEST VIRGINIA, ASSIGNOR OF ONE-FOURTH TO LOUIS FINK AND ONE-FOURTH TO GEORGE K. SWEENEY, BOTH OF GHENT, WEST VIRGINIA

AUTOMATIC GATE

Application filed August 11, 1932. Serial No. 628,389.

This invention relates to gates and more particularly to a gate of the vehicle actuated type which when erected across a road or driveway will be normally closed and will be automatically opened as a vehicle approaches the gate from either direction and again closed after the vehicle has passed through the gateway.

One object of the invention is to so construct the gate that while it will normally remain closed it can be easily opened by the weight of a vehicle moving upon a platform forming part of the operating mechanism and immediately return to a closed position after passage of the vehicle.

Another object of the invention is to so form the actuating mechanism for the gate that when an automobile or other vehicle approaches the gate from either side thereof the gates which are hingedly mounted at opposite sides of the road will always swing open in a direction away from the vehicle and thereby allow the vehicle to easily pass through the gateway.

Another object of the invention is to provide improved means for securing the gates when shut and only permit opening of the gates after the latching means has been moved to a releasing position. By this arrangement the gates will not be opened if horses or cattle step upon the actuating platforms and therewill be no danger of the gates being inadvertently opened and horses or cattle allowed to escape from a field having its entrance closed by the improved gate.

Another object of the invention is to provide a vehicle actuated gate which is simple in construction, efficient in its operation and not liable to get out of order and fail to operate properly.

The invention is illustrated in the accompanying drawings wherein:

Fig. 4 is an enlarged fragmentary sectional view of the actuating platforms and one of the gate posts.

Fig. 5 is a view in elevation of the gate post and sleeve shown in Fig. 4.

Fig. 6 is a fragmentary sectional view taken along the line 6—6 of Fig. 2 and illustrating the latch which prevents rotation of each gate post and releasably holds the gates closed.

This improved gate has been illustrated in operative relation to a road or private driveway but it will be understood that it may be used as a mine door for controlling ventilation of the mine or at other places where it is desired to provide a closure and have the closure remain closed except when a vehicle is passing through the gateway.

Figure 1:
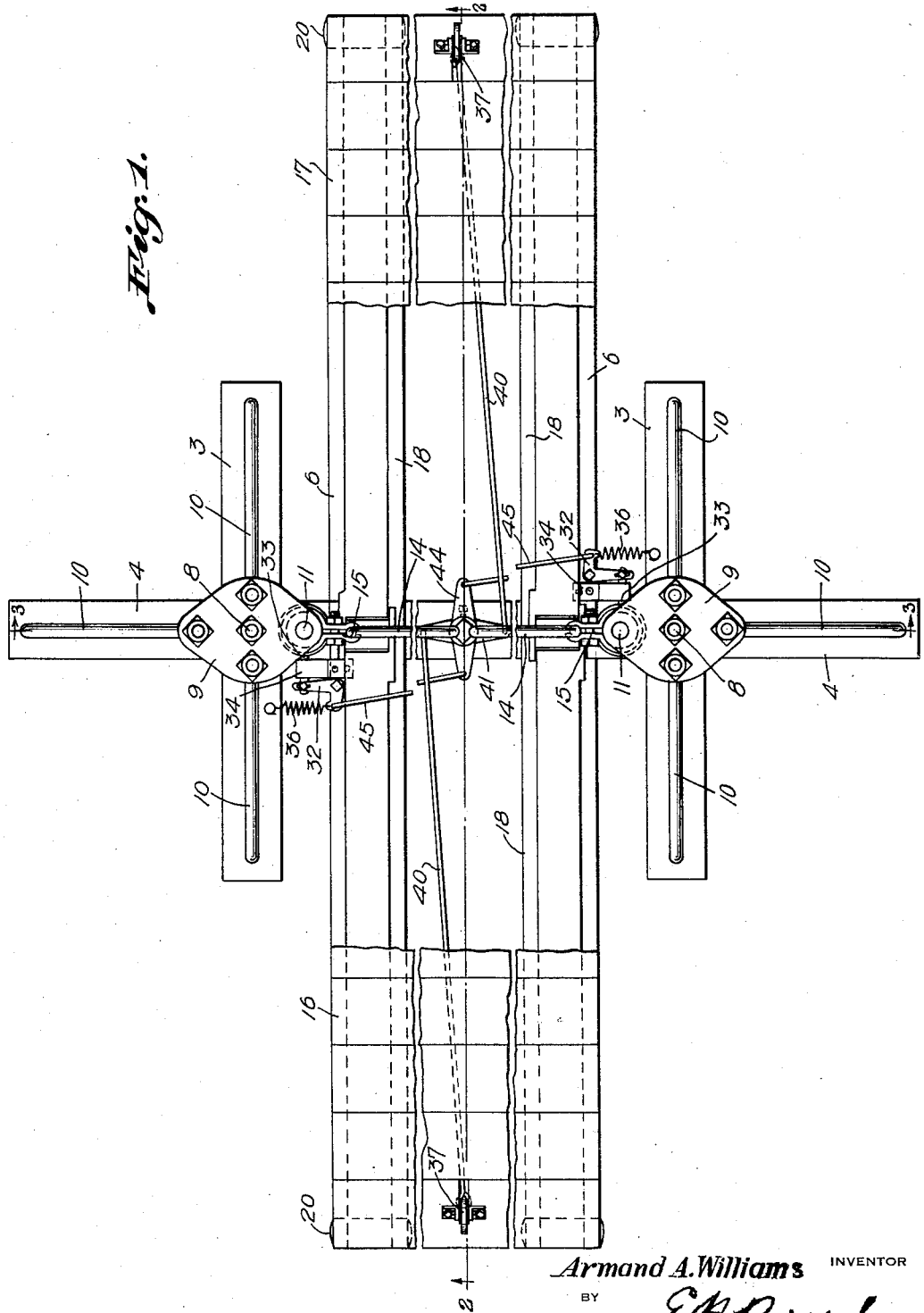
Fig. 1 is a top plan view with portions of the platforms broken away and showing the gates closed.
Figure 2:
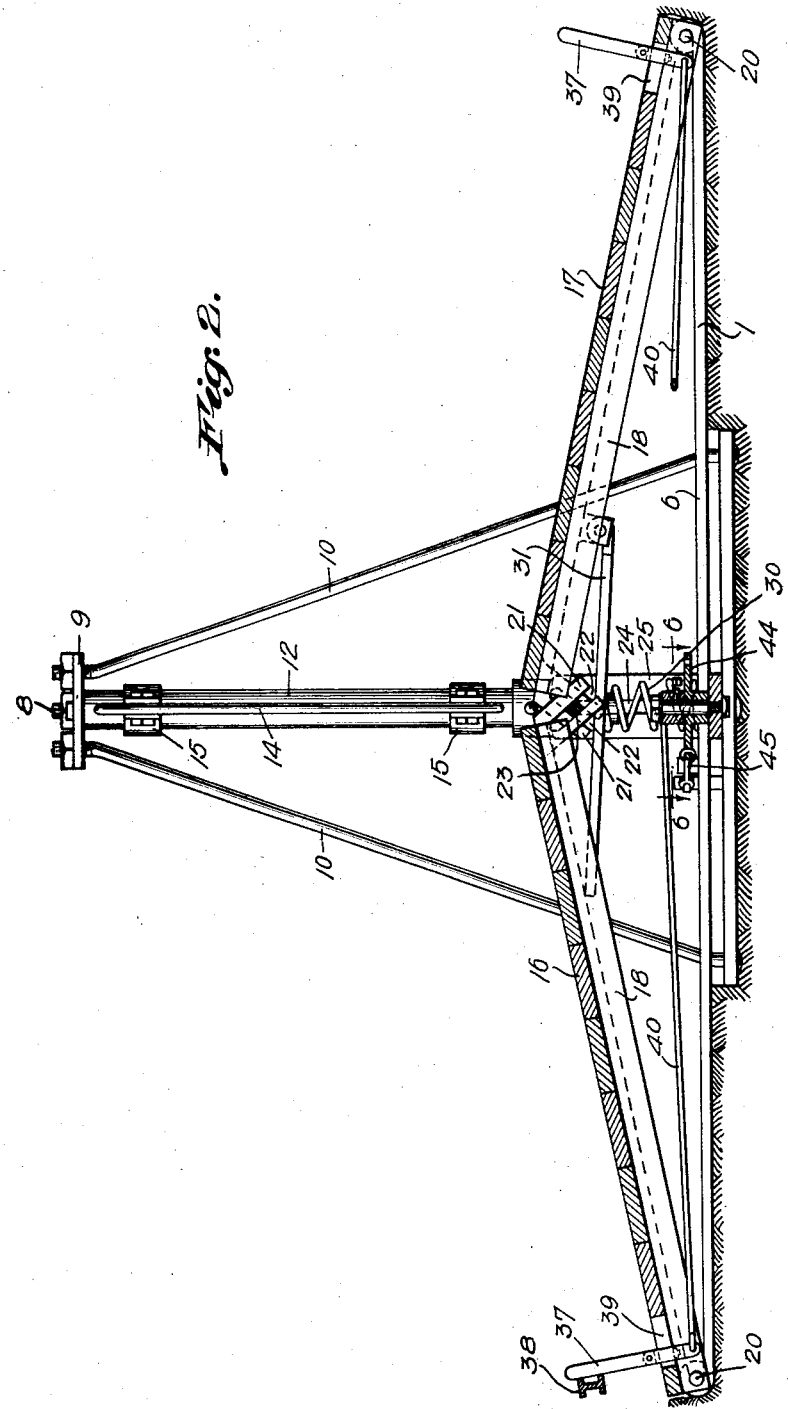
Fig. 2 is a sectional view taken longitudinally through the platforms along the line 2—2 of Fig. 1.
Figure 3:
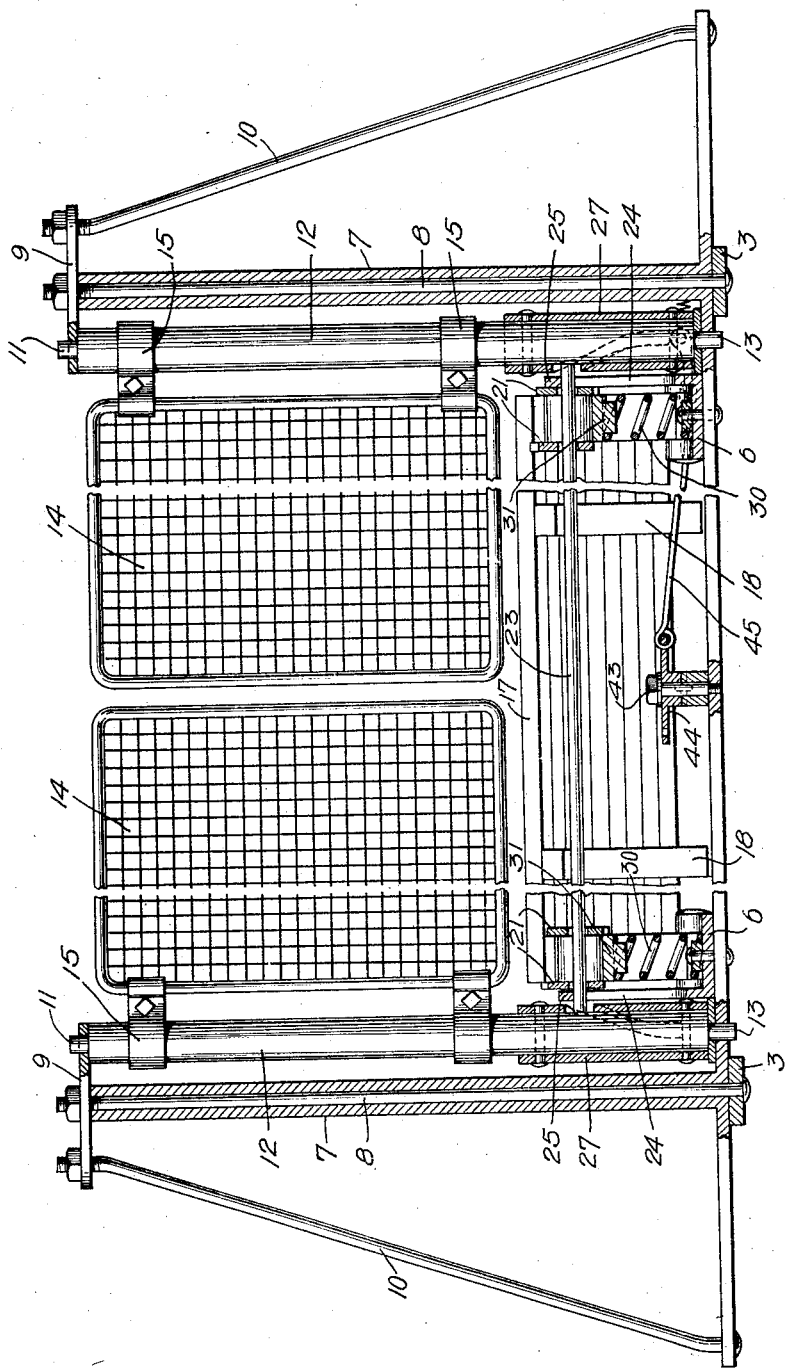
Fig. 3 is a transverse section taken along the line 3—3 of Fig. 1.

In order to install the improved gate, the roadway is cut away as shown at 1 to form a depression extending equal distances from a gateway in a fence and intermediate the length of this depression, it is further deepened to form a seat 2 in which a supporting frame is mounted. This frame has base bars 3 connected by a crossbar 4 the ends of which project beyond the base bars as shown in Fig. 1. There has also been provided bars 6 which extend in crossed relation to the bar 4 and project from the opposite ends of the seat 2 with their end portions resting in end portions of the depression 1. Referring to Fig. 1 it will be seen that since the thickness of the bars 3 and 4 correspond to the depth of the seat 2 and the bars 6 are secured upon the upper face of the bar 4 and rest flat upon the bottom of the depression 1, the supporting frame for the gates will be firmly supported and prevented from having vertical movement when installed.

Standards 7 rise from the bars 4 above the base bars 3 and through these standards extend rods 8 which serve to secure the bars 3 and 4 in cross relation to each other and have their upper ends engaged through plates 9 which are braced and supported in a horizontal position by bracing rods 10. Inner ends of the plates 9 are perforated to receive journals 11 at the upper ends of posts 12 and at their lower ends the posts are formed with other journals 13 engaged through openings formed in the cross bar 4. Therefore, the posts will be rotatably mounted and the gates 14 which are secured to the posts by clamps 15 will be swung towards opened and closed positions when the posts are rotated first in one direction and then in an opposite direction.

In order to impart swinging movement to the gates there has been provided platforms or treadles 16 and 17 each consisting of boards secured upon bars 18 disposed between the bars 6 and at their outer ends pivotally mounted by pivot pins or rods 20 carried by bars 6. From inner ends of the bars 18 extend arms 21 formed with slots 22 to receive a rod 23 extending parallel to the cross bar 4 above the same and it should be noted that the arms extend downwardly at an incline in crossed relation to each other as shown in Fig. 4. End portions of the rod 23 engage through slots 24 formed vertically in brackets 25 rising from the bars 6 and ends of the rod are seated in tracks 26 formed in sleeves 27 fixed about lower portions of the posts. These tracks consist of slots cut in the sleeves and by referring to Figure 5 it will be seen that each track is of an inverted V-shape and has arms 28 and 29 extending spirally about the sleeve and converging upwardly with their upper ends intersecting. Therefore when the rod 23 is forced downwardly it is held in a straight path by the brackets 25 and since its ends move through spirally extending arms of the tracks 26 the sleeves and posts will be rotated and the gates swung to an open position. Due to the fact that the arms or brackets 21 of the platforms are inclined in opposite directions and diverge from the platforms the rod will always move through the arms 28 of the tracks when the treadle 16 is depressed and move through the arms 17 of the tracks when the treadle 17 is depressed. It will thus be seen that when a vehicle is approaching the gateway and passes through the same the gates will be swung away from the treadle over which the vehicle first passes and will not be liable to strike the front of the vehicle or horses drawing the same as they open. The gates remain open until the vehicle passes off of both treadles and are then closed by the action of springs 30 seating upon bars 6 and having their upper ends bearing against abutment strips 31 which bridge inner end portions of the treadles and are pivoted to bars 18 of the treadle 17. It will thus be seen that as a vehicle approaches the gateway to pass through the same both treadles will be moved downwardly and the gates opened away from the vehicle and after the vehicle has moved off of the far treadle the springs will raise the treadles and cause the gate to close.

It is desired to prevent the gate from being opened if horses or cattle step upon the treadles and thus prevent the gates from being accidentally opened and allowing the animals to stray away. In order to do so there has been provided latches 32 in the form of bell cranks pivotally mounted upon the bars 6 adjacent the cross bar 4 and pivotally and slidably connected to pins 33. The pins 33 are slidably mounted by brackets 34 and by engaging in seats 35 formed in the sleeve 27 will prevent rotation of the posts and firmly secure the gates closed. Springs 36 urge the bell crank levers and pins towards the position shown in Figs. 1 and 6 and cause the pins to enter the seats when the gates are closed.

The latches are to be released when a vehicle approaches the gateway from either direction and therefore there has been provided triggers 37 pivotally mounted near outer ends of the treadles and extending vertically with their upper portions projecting above the treadles a sufficient distance for engagement by the axle 38 or any other portion of a vehicle desired. The lower ends of the triggers extend through slots 39 in the treadles and are pivoted to draw rods 40 which extend longitudinally beneath the treadles and at their inner ends are pivoted to ends of a cross arm 41 projecting from opposite sides of a hub or sleeve 42. Thus the hub is rotatably mounted upon a pin or stud 43 and the hub carries a second cross arm 44 disposed at right angles to the cross arm 41 and having its ends pivoted to draw rods 45 leading to and pivoted to the bell crank levers 32. By this arrangement the gates will be normally firmly held closed but when a vehicle approaches the gateway and the axle strikes a trigger the latches will be moved to a releasing position and permit the treadles to be depressed and the gates opened. The pins bear against the sleeves when the gates are open and as the gates close they enter the seats and again secure the gates in a closed position.

I have therefore provided a gate which normally remains closed but will automatically open as a vehicle approaches the gateway and again close after the vehicle has passed through the gateway. I have further provided a gate which will be actuated and opened by a vehicle but will normally be securely held closed and will not be opened if horses or cattle walk upon the platforms.

Having thus described my invention, what I claim as new and desire to secure by Letters Patent is:

1. In a vehicle actuated gate, vertical posts rotatably mounted and defining a gateway between them, gates carried by said posts and when closed extending towards each other, treadles approaching the gateway from opposite directions and pivotally mounted at their outer ends, means actuated from inner ends of the treadle to rotate the posts and swing the gates open in a direction away from the treadle over which a vehicle first passes when approaching the gateway, and means to releasably secure the gates closed including actuating rods extending longitudinally of the treadles beneath the same and connected with triggers mounted adjacent outer ends of the treadles with portions projecting upwardly through the treadles for engagement by a vehicle approaching the gateway and automatic return means for the gate.

2. In a vehicle actuated gate, vertical posts rotatably mounted and defining a gateway between them, gates carried by said posts and when closed extending towards each other, treadles approaching the gateway from opposite directions and pivotally mounted at their outer ends, sleeves secured about said posts and each formed with tracks converging upwardly and having their upper ends intersecting, a rod extending between said posts with its ends engaged in the intersecting ends of the track when the gates are closed, and arms extending downwardly from said treadle at an opposite incline and engaging said rod to move the rod downwardly in the tracks and swing the gates open in a direction away from an approaching vehicle when either treadle is depressed and automatic return means for the gate.

3. In a vehicle actuated gate, a frame having longitudinal extending bars and a cross bar intermediate their ends, standards rising from said cross bar, vertical posts rotatably mounted between the cross bar and upper ends of said standards and spaced from each other to define a gateway between the longitudinally extending bars, gates carried by said posts and normally extending across and closing the gateway, treadles approaching the gateway from opposite directions and having their outer ends pivotally connected with outer ends of the longitudinally extending bars, sleeves fixed about the lower portions of said posts each formed with a track having branches extending spirally about the sleeve and converging upwardly with their upper ends intersecting, a rod extending between said posts with its ends engaged in the tracks arms extending downwardly from the inner ends of said treadles at opposite inclines and formed with slots receiving said rod and serving to depress the rod when either treadle is moved downwardly by weight of a vehicle moving over the same and cause ends of the rod to move through branches of said tracks to rotate the posts and swing the gates open, and springs yieldably supporting said rod and serving to raise the rods and treadles and return the gates to a closed position.

4. In a vehicle actuated gate, a frame having longitudinally extending bars and a cross bar intermediate their ends, standards rising from said cross bar, vertical posts rotatably mounted between the cross bar and upper ends of said standards and spaced from each other to define a gateway between the longitudinally extending bars, gates carried by said posts and normally extending across and closing the gateway, treadles approaching the gateway from opposite directions and having their outer ends pivotally connected with outer ends of the longitudinally extending bars, sleeves fixed about the lower portions of said posts each formed with a track having branches extending spirally about the sleeve and converging upwardly with their upper ends intersecting, a rod extending between said posts with its ends engaged in the tracks, arms extending downwardly from the inner ends of said treadles at opposite inclines and formed with slots receiving said rod and serving to depress the rod when either treadle is moved downwardly by weight of a vehicle moving over the same and cause ends of the rod to move through branches of said tracks to rotate the posts and swing the gates open, means to return the treadles and rod to a raised position and close the gates after passage of a vehicle through the gateway, a pivot rising from said cross bar intermediate the ends thereof, a hub rotatable about said pivot, crossed arms carried by said hub, and automatic return means for the gate.

5. In a vehicle actuated gate, a frame having longitudinally extending bars, vertical posts rotatably mounted at opposite sides of said frame to define a gateway between the longitudinally extending bars, gates carried by said posts to extend across and close the gateway, treadles approaching the gateway from opposite directions and having their outer ends pivotally connected with said bars, said posts being each provided with a track having branches extending spirally about the post and converging upwardly with their upper ends intersecting, a rod extending between said posts with its ends engaged in the tracks of said posts, arms extending downwardly from inner ends of said treadles and formed with slots receiving said rod and serving to depress the rod when either treadle is moved downwardly and cause ends of the rod to move through branches of the tracks to rotate the posts and swing the gates open, and yieldable means normally retaining the rod and treadles in a raised position with the gates closed.

6. In a vehicle actuated gate, vertical posts rotatably mounted in spaced relation to each to define a gateway, gates carried by said posts to extend across and close the gateway, treadles approaching the gateway from opposite directions, said treadles being pivotally mounted at their outer ends and having their inner ends terminating close to each other in the gateway, a horizontal rod extending between said posts and yieldably supported in an elevated position, arms carried by inner ends of said treadles and engaging said rod to depress the rod when either treadle is swung downwardly by a vehicle moving over the same towards the gateway and cause the treadles to move in unison, said posts being each provided with a track having branches extending spirally about the post and intersecting at their upper ends, and ends of the rod being engaged in the tracks to rotate the posts and swing said gates into and out of a closed position when the treadles are moved.

In testimony whereof, I affix my signature.

ARMAND A. WILLIAMS.